UNITED STATES PATENT OFFICE.

ISRAEL BERNITZ, OF NEW YORK, N. Y.

POLISHING COMPOSITION.

1,196,508.  Specification of Letters Patent.  Patented Aug. 29, 1916.

No Drawing.  Application filed January 5, 1916.  Serial No. 70,382.

*To all whom it may concern:*

Be it known that I, ISRAEL BERNITZ, a subject of the Czar of Russia, and resident of New York city, borough of the Bronx, in the county of Bronx and State of New York, have invented certain new and useful Improvements in Polishing Compositions, of which the following is a specification.

The object of my invention is to provide a composition, substantially in the form of a paste, adapted to polish surfaces of wood and metal, when applied thereto and rubbed thereon, without injury to such surfaces and without injury to the user.

In making my improved polishing composition I mix together ceresin, beeswax, paraffin, linseed oil, spirits of turpentine, and carbolic acid. A good proportion of such ingredients I find to be as follows: ceresin eight ounces, beeswax two ounces, paraffin two ounces, linseed oil six ounces, spirits of turpentine twenty-eight ounces, carbolic acid one dram.

The aforesaid ingredients may be combined in the following manner: The ceresin, beeswax and paraffin may be placed in a suitable vessel, and heated to a suitable degree until they attain a liquid state, and then such liquid may be poured into the spirits of turpentine; to the mixture so formed the linseed oil is added, and then the carbolic acid is added to the last named mixture, and then the mass is stirred until it is slightly cold and attains a paste-like form. Thereafter the paste so formed may be put up for sale and use in any desired form, such as by placing the same in jars, boxes and the like.

The proportions of the ingredients herein stated may be varied within approximate limits in accordance with the character of the polishing composition or paste desired with reference to surfaces to be polished.

My improved composition may be applied upon the surface to be polished and rubbed thereover with a soft cloth, or brushed, and wiped dry. The surfaces, such as floors, furniture, vehicle bodies, and metal parts, polished by means of my improvements will not be injured or stained thereby, and the paste will not injure the hands of the user.

Having now described my invention what I claim is:—

1. A polishing composition comprising ceresin, beeswax, paraffin, linseed oil, spirits of turpentine, and carbolic acid substantially in the proportions described.

2. A polishing composition comprising ceresin, about eight ounces, beeswax, about two ounces, paraffin, about two ounces, linseed oil, about six ounces, spirits of turpentine, about twenty-eight ounces, and carbolic acid, about one dram.

3. The method of making a polishing composition herein described consisting in mixing ceresin, beeswax and paraffin, in about proportions described, and heating the same until it attains a liquid form, then pouring said mixture into spirits of turpentine in about the proportion stated, then adding to such mixture linseed oil and carbolic acid in about the proportions stated, and then stirring the same until it is slightly cold.

Signed at New York city, in the county of New York and State of New York, this 4th day of January A. D. 1916.

ISRAEL BERNITZ.

Witnesses:
T. F. BOURNE,
ABRAHAM M. GRILL.